No. 684,196.  
A. F. CURTIN.  
CONNECTION FOR WATER CLOSET BOWLS.  
(Application filed Apr. 24, 1901.)
Patented Oct. 8, 1901.
(No Model.)
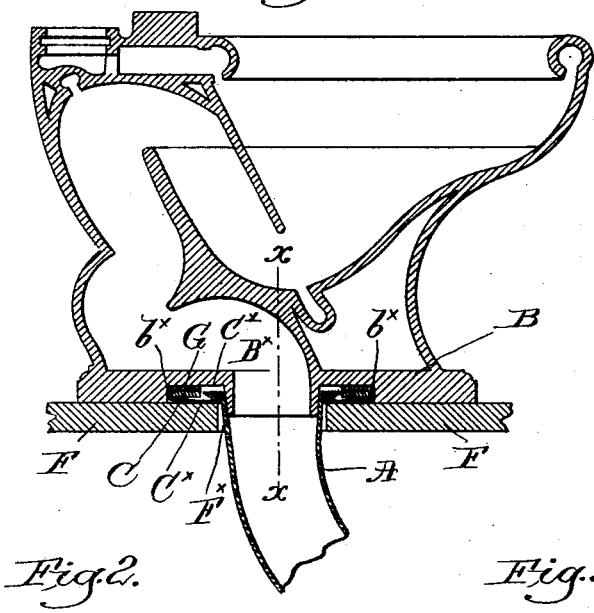
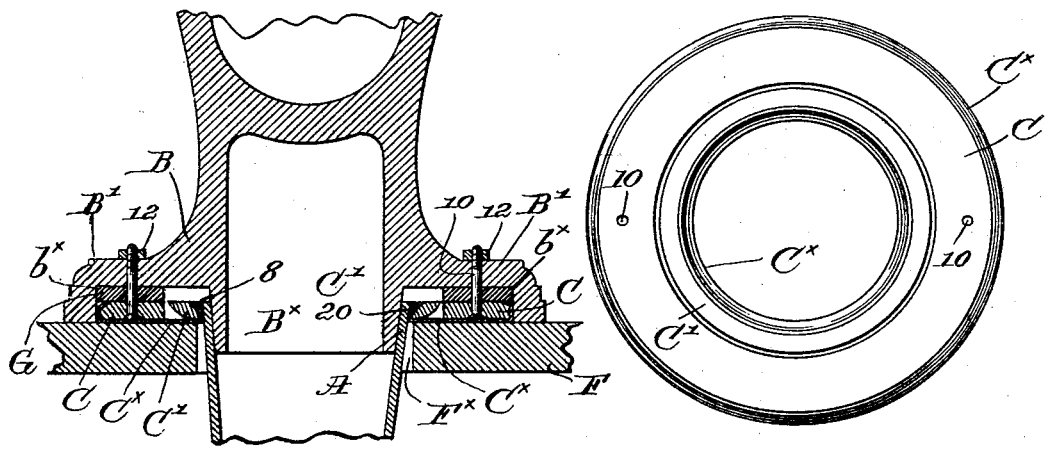
Witnesses.  
Inventor.  
Andrew F. Curtin,  
by Crosby & Gregory  
Attys.

UNITED STATES PATENT OFFICE.

ANDREW F. CURTIN, OF MEDFORD, MASSACHUSETTS.

CONNECTION FOR WATER-CLOSET BOWLS.

SPECIFICATION forming part of Letters Patent No. 684,196, dated October 8, 1901.

Application filed April 24, 1901. Serial No. 57,169. (No model.)

*To all whom it may concern:*

Be it known that I, ANDREW F. CURTIN, a citizen of the United States, and a resident of Medford, county of Middlesex, State of Massachusetts, have invented an Improvement in Connections for Water-Closet Bowls, of which the following description, in connection with the accompanying drawings, is a specification, like letters and figures on the drawings representing like parts.

This invention has for its object the production of a simple, cheap, and novel device for connecting the soil-pipe or "lead bend," as it is often termed, with the base of a closet-bowl, whereby a perfectly-tight joint can be attained.

The base of a closet-bowl is usually recessed to fit over the floor flange or plate, which is attached to the floor and surrounds the upper end of the soil-pipe, and a gasket of rubber or other suitable material, putty, or the like is inserted between the flange and the recess in the base to make a tight joint. When the base is screwed down until its bottom edges rest upon the floor, it is impossible for the workman to tell with any certainty whether the gasket or other packing has been compressed to make a water-tight and gas-tight joint. It is manifest that such uncertainty is highly objectionable, and in my present invention I have provided means whereby an absolutely gas and water tight joint can be secured and the packing subjected to any desired degree of compression.

Figure 1 is a vertical sectional view of a type of siphon water-closet with one embodiment of my invention illustrated in connection therewith. Fig. 2 is an enlarged sectional detail on the line $x\ x$, Fig. 1, to show the base of the closet-bowl when viewed from front or rear. Fig. 3 is a top or plan view of the connection made in accordance with my invention, and Fig. 4 is an enlarged sectional detail showing the connection in part after the packing has been compressed.

I have herein shown my invention in use with a siphon water-closet; but it is not restricted to such type, as it can be employed with any type of closet the base of which is provided in its bottom with a recess to receive the joint-packing.

The closet-base B, having the outlet-elbow or discharge-pipe $B^\times$, has a packing-recess $b^\times$ in its bottom surrounding said elbow, Figs. 1 and 2, and at its sides the base is laterally widened, as at B', Fig. 2, the base resting firmly upon the floor F when properly set.

The soil-pipe or lead bend is shown at A, Figs. 1, 2, and 4, of usual construction, extended up through a hole $F^\times$ in the floor and receiving snugly within it the elbow $B^\times$.

It is manifest that the connecting-joint between the soil-pipe and the closet-base should be absolutely gas and water tight and of such construction that the plumber can be assured of the fact when the work is completed, and in the present embodiment of my invention I connect a rigid base-plate with the soil-pipe by a flexible diaphragm, and the base-plate is thereafter pressed upon the packing in the closet-base with any desired degree of pressure.

The base-plate C is shown as a flat ring-like member, preferably made of brass or other rigid metal and of such a width that it will readily enter the recess $b^\times$ of the closet-base. A flexible diaphragm $C^\times$, of sheet-copper or other suitable flexible metal, is carried beneath the base-plate and bent up around the periphery thereof and permanently secured to the periphery by soldering, brazing, or in other suitable manner, as at 5. The diaphragm has a flanged opening therein to receive the upper end of the soil-pipe, to which the diaphragm is permanently secured, as by soldering or wiping; but for convenience in spinning up the flange 20 and also to support and hold the latter in place I prefer to use a stiffening head or backing C', which herein is shown as a ring of sufficient diameter to receive the soil-pipe and having its inner circumference beveled at its upper end, as at $c'$, Fig. 4. Its outer circumference is also preferably curved or rounded transversely, as shown at $c^2$. The head may be made of brass or any other rigid metal, and the flange 20 is spun over the inner edge of the head and onto the beveled portion $c'$, and it is permanently attached, usually by solder, (see heavy lines 6,) to the inner circumference of the head, which thus keeps the flange in shape with its lip flared for a purpose to be described.

In using the device the upper end of the soil-pipe is brought through the head C' and soldered or wiped onto the flange, solder being indicated in the drawings, Figs. 1, 2, and 4 at 8, after which a gasket G or other suitable form of packing is inserted in the recess $b^\times$ of the closet-base, and the latter is set up over the base-plate C. The latter is provided with any suitable number of upright attaching-bolts 10, which pass upwardly through holes in the closet-base extensions B, (see Fig. 2,) and retaining-nuts 12 are screwed onto the threaded ends of the bolts. Now by setting up the nuts it is manifest that the base-plate will be drawn upward into the recess $b^\times$ against the under side of the packing G, the latter being thereby compressed to the desired extent to form an absolutely tight joint. The central portion of the diaphragm is held in fixed position by the practically-unyielding soil-pipe, and when the base-plate is raised, as has been described, the diaphragm $C^\times$ flexes and permits such movement without destroying the integrity of the joint between the upper end of the soil-pipe and the base-plate, and the packing completes the joint between the latter and the base of the closet. The closet-bowl is secured to the floor in usual manner, and it will be manifest that the compression of the packing by the lifting of the base-plate does not in the slightest degree affect the set of the closet-bowl. By rounding the outer circumference of the head C' the flexure of the diaphragm is facilitated when the base-plate is set up to compress the packing. The flaring of the lip of the flange 20 by bending it back against the bevel $c'$ of the head serves, with the outer wall of the soil-pipe, to form a gutter or trough surrounding the latter to receive and hold the solder and which firmly secures the soil-pipe to the diaphragm.

It will be manifest that the base-plate may be made oval or oblong instead of circular, if desired, without departing from the spirit and scope of my invention, and the head or backing C' may be dispensed with, if desired.

Having fully described my invention, what I claim as new, and desire to secure by Letters Patent, is—

1. In a device of the class described, a flexible diaphragm adapted to be retained at its outer edge in the packing-recess of a closet-base and at its inner edge at the upper end of the soil-pipe, the retaining means for the outer edge thereof consisting of a rigid base-plate above said diaphragm, said diaphragm being unattached to said base-plate excepting at its extreme outer edge where it is permanently secured to the outer circumference of the base-plate, and means located entirely above said diaphragm for securing said base-plate to the closet-base.

2. In a device of the class described, a rigid annular base-plate adapted to enter the recessed base of a closet-bowl, a concentric rigid head within the base-plate, a flexible connection between the base-plate and head permanently secured to each, and means to connect the base-plate to the base of the closet-bowl and to draw the said base-plate into the recessed base, the yielding connection permitting relative axial movement of the head and base-plate when the former is firmly connected with the soil-pipe.

3. In apparatus of the class described, a rigid open base-plate adapted to enter the packing-recess in the base of a closet-bowl, an annular, rigid head within the base-plate, and a flexible diaphragm extended beneath the latter and the head and permanently secured to the outer side of the base-plate and to the inner circumference of the head.

4. An annular, rigid head, or backing having its inner circumference beveled at its upper edge, a surrounding and concentric base-plate, and a flexible diaphragm extended beneath the head and the base-plate and permanently secured to the outer circumference of the latter and to the inner circumference of the head.

5. A closet-bowl having a packing-recess in the lower end of its base, packing therein, a base-plate adjustably connected with the closet-base, to compress the packing, and a flexible diaphragm permanently secured to the base-plate and having a flanged opening adapted to receive and be secured to the upper end of the soil-pipe, flexure of the diaphragm permitting the base-plate to be drawn up into the recess in the closet-base to compress the packing therein and form a gas and water tight joint.

In testimony whereof I have signed my name to this specification in the presence of two subscribing witnesses.

ANDREW F. CURTIN.

Witnesses:
JOHN C. EDWARDS,
AUGUSTA E. DEAN.